United States Patent
Rozhkov et al.

(10) Patent No.: US 8,009,792 B2
(45) Date of Patent: *Aug. 30, 2011

(54) DISTANCE LATTICE FOR FUEL ROD ASSEMBLY IN NUCLEAR REACTOR

(75) Inventors: Vladimir Vladimirovich Rozhkov, Novosibirsk (RU); Petr Ivanovich Lavrenyuk, Moscow (RU); Aleksandr Antonovich Kislitsky, Novosibirsk (RU); Vladimir Mikhailovich Troyanov, Kaluzhskaya obl. (RU); Anatoly Alekseevich Enin, Novosibirsk (RU); Mstislav Aleksandrovich Shustov, Novosibirsk (RU); Aleksandr Pavlovich Ustimenko, Novosibirsk (RU); Mikhail Mikhailovich Nekhoda, Novosibirsk (RU); Oleg Borisovich Samoilov, Nizhny Novgorod (RU)

(73) Assignees: Tvel, Moscow (RU); Novosibirsky Zavod Khimkontsentratov, Novosibirsk (RU)

( * ) Notice: Subject to any disclaimer, the term of this patent is extended or adjusted under 35 U.S.C. 154(b) by 47 days.

This patent is subject to a terminal disclaimer.

(21) Appl. No.: 11/994,398

(22) PCT Filed: Jul. 4, 2006

(86) PCT No.: PCT/RU2006/000350
§ 371 (c)(1),
(2), (4) Date: Dec. 31, 2007

(87) PCT Pub. No.: WO2007/008114
PCT Pub. Date: Jan. 18, 2007

(65) Prior Publication Data
US 2008/0205579 A1 Aug. 28, 2008

(30) Foreign Application Priority Data
Jul. 8, 2005 (RU) .............................. 2005121472

(51) Int. Cl.
*G21C 3/34* (2006.01)
(52) U.S. Cl. ........................................ 376/462; 376/438
(58) Field of Classification Search ............... 376/438, 376/462
See application file for complete search history.

(56) References Cited

U.S. PATENT DOCUMENTS

| | | | |
|---|---|---|---|
| 3,457,140 | A | 7/1969 | Glandin |
| 3,787,286 | A | 1/1974 | Anthony |
| 3,791,466 | A | 2/1974 | Patterson et al. |
| 3,984,284 | A | 10/1976 | Long |

(Continued)

FOREIGN PATENT DOCUMENTS

EP 0192534 8/1986

(Continued)

*Primary Examiner* — Rick Palabrica
*Assistant Examiner* — Erin M Leach
(74) *Attorney, Agent, or Firm* — Bardmesser Law Group

(57) ABSTRACT

The invention relates to nuclear engineering and can be used for fuel clusters of nuclear reactors, for distancing and fixing fuel elements, in particular in the fuel clusters of PWR and BWR reactors. The inventive distance lattice comprises cells which are used for mounting the fuel elements or guide channels and are formed by perpendicular crossing plates. Bent blades for mixing a coolant are embodied on the plate edges at the output of said coolant. Each cell is provided with an insertable distancing element for fixing the fuel element. Said invention makes it possible to increase the turning rigidity of the cells and the stability thereof, to simultaneously reduce the size of the fixation of the fuel elements or the guiding channels in the cells and to decrease the hydraulic resistance of the lattice.

7 Claims, 2 Drawing Sheets

U.S. PATENT DOCUMENTS

| | | | |
|---|---|---|---|
| 4,081,324 A | 3/1978 | Flora et al. | |
| 4,411,862 A | 10/1983 | Leclerq et al. | |
| 4,585,616 A * | 4/1986 | DeMario et al. | 376/442 |
| 4,692,303 A | 9/1987 | Osborne | |
| 4,780,273 A | 10/1988 | Dressel | |
| 4,879,090 A | 11/1989 | Perotti et al. | |
| 4,988,474 A | 1/1991 | Hoffmann et al. | |
| 5,032,351 A | 7/1991 | Johannson | |
| 5,089,221 A | 2/1992 | Johansson et al. | |
| 5,186,891 A | 2/1993 | Johansson et al. | |
| 5,243,635 A | 9/1993 | Bryan | |
| 5,327,470 A | 7/1994 | Johannson | |
| 5,361,288 A | 11/1994 | Johannson | |
| 5,365,557 A | 11/1994 | Meseth | |
| 5,440,599 A * | 8/1995 | Rodack et al. | 376/439 |
| 5,862,196 A * | 1/1999 | Wolfram | 376/439 |
| 5,875,223 A | 2/1999 | Nylund | |
| 6,236,702 B1 | 5/2001 | Chun et al. | |
| 6,473,482 B1 | 10/2002 | Steinke | |
| 6,526,116 B1 | 2/2003 | Nguyen et al. | |
| 6,816,563 B2 | 11/2004 | Nylund | |
| 2006/0153327 A1 * | 7/2006 | Jiang | 376/438 |

FOREIGN PATENT DOCUMENTS

| | | |
|---|---|---|
| EP | 1679722 | 7/2006 |
| RU | 2189644 C2 | 9/2002 |
| RU | 2192051 | 10/2002 |
| RU | 2249865 C1 | 4/2005 |
| SU | 2124239 | 12/1988 |
| WO | WO 2005069308 A1 * | 7/2005 |

* cited by examiner

DISTANCE LATTICE FOR FUEL ROD ASSEMBLY IN NUCLEAR REACTOR

FIELD OF THE INVENTION

This invention relates to nuclear engineering and may be used in structures of nuclear fuel rod assemblies for spacing and fixing fuel rods, in particular in fuel rod assemblies used in PWR and BWR reactors where fuel rods are arranged in square pattern.

PRIOR ART

In order to ensure a required spacing between fuel rods during the whole operation term of a fuel rod assembly spacing grids are used which also fix fuel rods in tightened positions for excluding fretting wear of fuel rod case materials. Spacing grid cells may be formed, in particular, by perpendicular crossing plates or by pressing from tube blanks and connecting them therebetween and to a surrounding rim by welding or soldering.

In order to exclude cross flows between fuel rod assemblies their spacing grids should have close hydraulic characteristics while being arranged at similar levels.

In order to exclude engagement of spacing grids of adjacent fuel rod assemblies during overloads, their rims are provided with lead-in edges.

Torsional stiffness of guide tubes depends on the configuration of cells in spacing grids.

The requirements to assemblability of fuel rods as well as to easy removal of fuel rods during repairs of a fuel rod assembly leads to the necessity of using compliant cells. At the same time, in order to ensure a pre-set torsional stiffness rigid cells are required.

Furthermore, elements performing the function of mixing a coolant should be provided for in spacing grid designs.

A spacing grid is known, which comprises cells formed by orthogonally crossing stripes, as well as coolant flow whirl devices (U.S. Pat. No. 5,365,557, G21 3/322, 15 Nov. 1994). Stripes of that design have shaped cutouts that are twisted differently.

Also, a spacing grid is known that comprises cells formed by orthogonally crossing stripes having cutouts and pressed spacing embossments (U.S. Pat. No. 6,236,702, G 21 3/34, 22 May 2001).

The upper parts of plates have tongues made thereon, which tongues are bent for the purpose of mixing a coolant.

As to the technical essence and achieved result, the closest to this invention is a spacing grid that comprises cells designed for inserting fuel rods and formed by orthogonal crossing plates having bent vanes for mixing a coolant on their ends located at the exit side of coolant flow (U.S. Pat. No. 6,526,116, G 21 C 3/322, 25 Feb. 2003). Plates in the known design have cutouts that are bent and that form spacing protrusions.

Known spacing grids should, on one hand, have sufficient rigidity for increasing rigidity of the skeleton of a complete fuel rod assembly, and, on the other hand, spacing protrusions, which are formed by cutouts in plates, should have certain flexibility, while ensuring a required degree of fixation for fuel rods.

Just these conditions are used for selecting thickness of orthogonal crossing plates, wherein said thickness is limited by a pre-set compliance of spacing protrusions. Furthermore, the presence of a plurality of protrusions and slots increase hydraulic resistance to a coolant flow.

SUMMARY OF THE INVENTION

The objective of this invention is to develop and create a spacing grid having improved characteristics.

Due to the achievement of the said objective it becomes possible to obtain technical effects consisting in increasing torsional stiffness of cells while, at the same time, reducing a degree of fixation of fuel rods in their cells as well as reducing hydraulic resistance of the grid.

The said technical effects may be achieved due to that in a spacing grid comprising cells designed for inserting fuel rods and formed by orthogonal crossing plates, at which ends on the exit side of a coolant flow bent vanes are made that are intended for mixing a coolant, each cell is provided with an insertable spacing element designed for fixation of the respective fuel rod.

A distinguishing feature of this invention consists in that each cell is provided with an insertable spacing element designed for fixation of the respective fuel rod. In the result, a possibility is provided for using plated of a greater thickness, which significantly increases their strength and, respectively, the rigidity of cells and, consequently, the whole skeleton of a fuel rod assembly. Thus, a strength of plates and that of material for an insertable spacing element are selected so as to ensure optimal conditions for their functioning.

Furthermore, the said insertable spacing element may be provided with spacing protrusions that are preferably made in the form of bosses.

It is preferable that a cell length is selected in the range from 28 mm to 34 mm, and a size of the said insertable spacing element along cell length is selected in the range from 0.3 to 0.9 of its length.

The said insertable spacing element has a closed contour and is made by pressing from a tube blank.

DESCRIPTION OF THE PREFERRED EMBODIMENT

Figure 1:
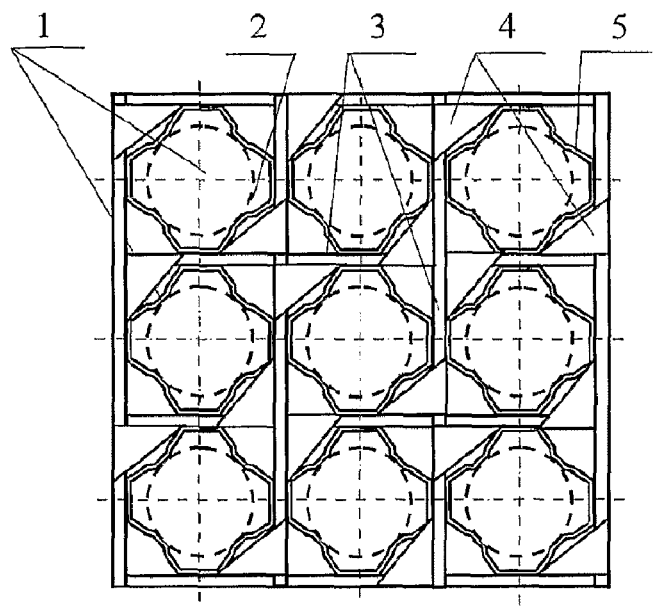
FIG. 1 shows a fragment of a spacing grid, which comprises 9 cells.
Figure 2:
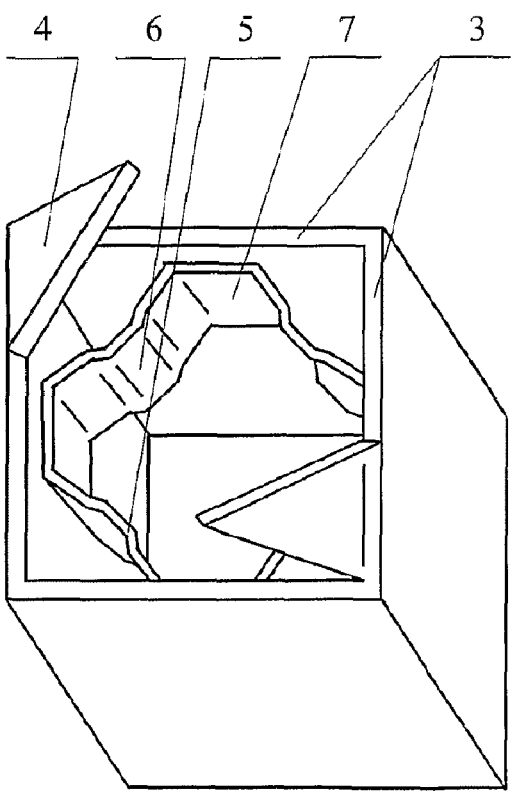
FIG. 2 shows an enlarged view of one cell.
Figure 3:
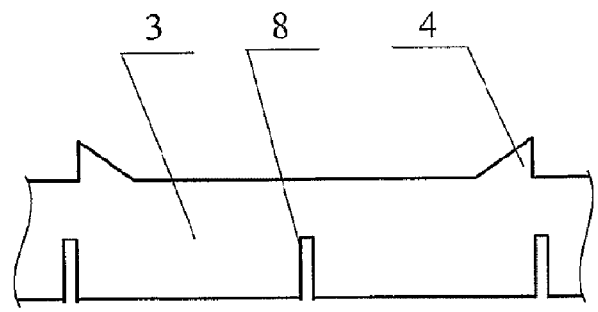
FIG. 3 shows a fragment of a strip.
Figure 4:
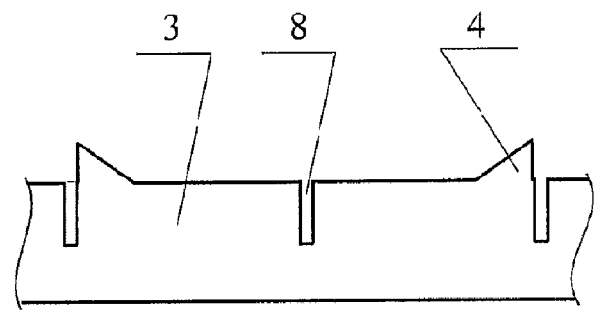
FIG. 4 shows a fragment of a strip that is perpendicular to the strip shown in FIG. 3.
Figure 5:
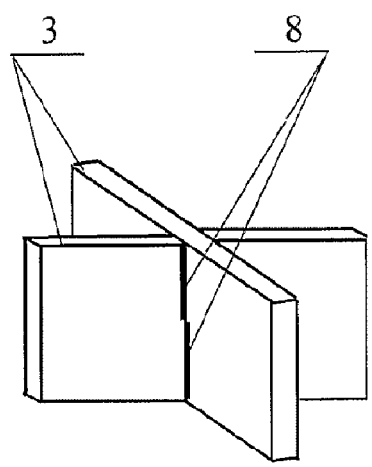
FIG. 5 shows a node of mutual crossing in cutouts of strips forming cells.

A spacing grid comprises a plurality of cells 1 intended for insertion of fuel rods or guide tubes 2. The cells 1 are formed by orthogonal crossing plates 3. The plates 3 have bent vanes 4, which are intended for mixing a coolant, on their ends located on the exit side of a coolant flow. Each cell 1 is provided with an insertable spacing element 5, which is designed for fixation of a fuel rod 2. The said insertable spacing element 5 has spacing protrusions that are made, in particular, as bosses 6. A length of the said cell 1 is selected in the range from 28 mm to 34 mm, and the size of the insertable spacing element along the cell length is from 0.3 to 0.9 if its length. The cells 1 are formed by mutual arrangement of stripes in slots 8. For this, the strip length should be at least half of its width. The slots 8 on orthogonally arranged strips are oriented toward opposite directions. The insertable spacing element 5 has closed contour on its periphery. The insertable spacing element is made by pressing of a tube blank and connected to the cell sides by, e.g., welding. For this, the insertable spacing element has four flat sides 7, between which spacing protrusions (shaped sides) with bosses 6 are arranged. The spacing grid of this invention functions in a fuel rod assembly as follows. A coolant passes through the cells 1 and washes the surfaces of fuel rods arranged in the cells. On the exit side of a cell a coolant interacts with vanes 4, which results in its mixing and, accordingly, to equalizing its temperature in a cross-section of the fuel rod assembly.

The spacing grid of this invention may be used as a support grid together with the main grid. In such a case a support grid and the main grid are embraced by a common rim.

The spacing grid of this invention may be made by any known method using standard technology and equipment and does not require creating absolutely new tools.

INDUSTRIAL APPLICABILITY

This invention is industrially applicable and may be most beneficially used in fuel rod assemblies for PWR and BWR reactors having fuel rods installed according to a square pattern. The spacing grid of this invention may be made with the use of any known equipment and does not require new technology or special tools.

What is claimed is:

1. A grid for a nuclear fuel rod assembly, the grid comprising:
   a plurality of perpendicularly flat plates, the flat plates forming substantially square cells;
   a plurality of deflectors formed integrally with the flat plates, wherein each deflector is oriented at an angle to a longitudinal axis of the grid, and wherein each cell has at least two opposing deflectors;
   each cell having an insertable spacer having a substantially octagonal shape that is [s]ymmetric about a center axis of the cell, the insertable spacer having a constant height along its perimeter, and a uniform cross-section along its height, the insertable spacer having a closed contour in a cross-sectional view, the insertable spacer formed of four convex surfaces and four concave surfaces, the four concave surfaces being in contact with the corresponding flat plates, and the four convex surfaces each having a flat portion for fixing a corresponding fuel rod and which is flat prior to insertion of the fuel rods,
   wherein opposite longitudinal surfaces of the insertable spacer are parallel to each other.

2. The spacing grid of claim 1, wherein a length of each cell is between 28 and 34 mm.

3. The spacing grid of claim 1, wherein a length of the spacer is between 0.3 and 0.9 of a length of each cell.

4. The spacing grid of claim 1, wherein the spacer is formed as a unitary element.

5. The spacing grid of claim 1, wherein the spacer has no openings along its body.

6. The grid of claim 1, wherein each concave surface has a flat portion in contact with a corresponding flat plate.

7. The grid of claim 1, wherein the insertable spacers are formed as tubular elements with a substantially octagonal cross-section.

* * * * *